March 9, 1926.
J. F. CRAIG
1,575,737
AUTOMOTIVE BRAKE
Filed Jan. 2, 1923
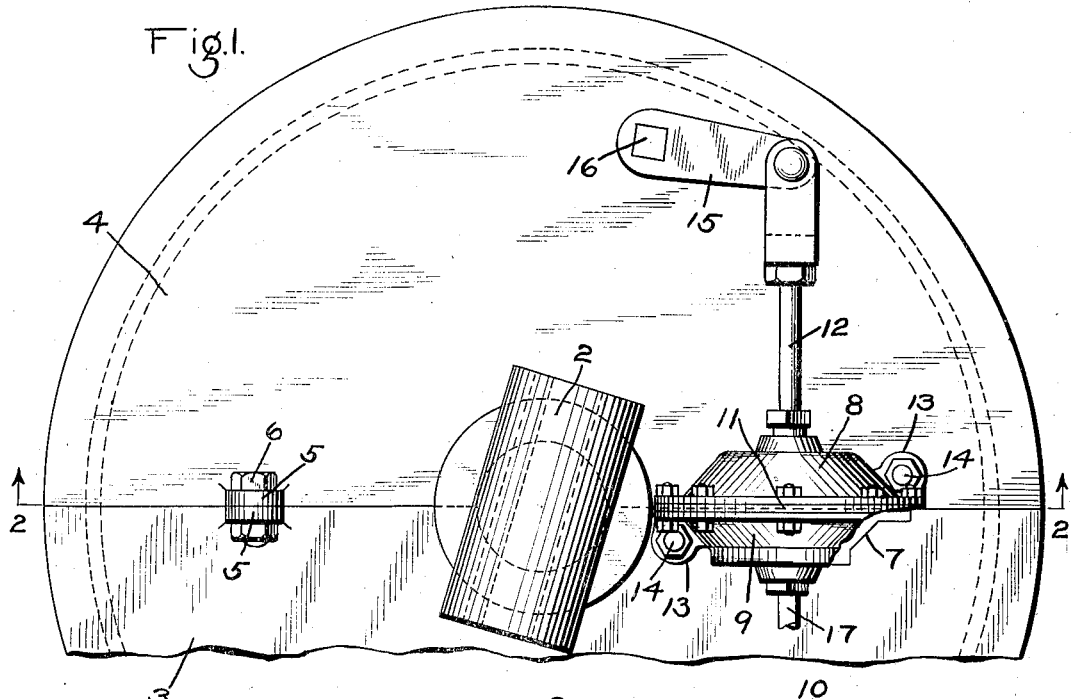
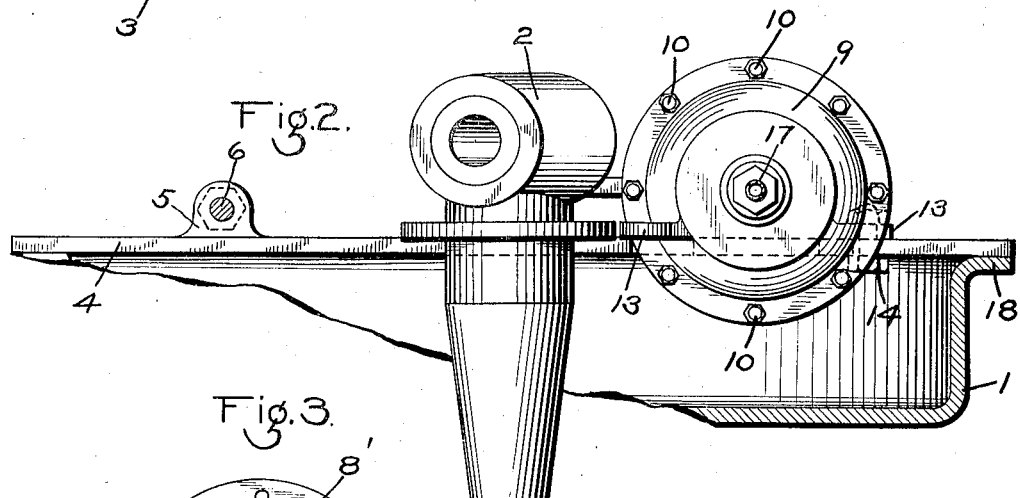
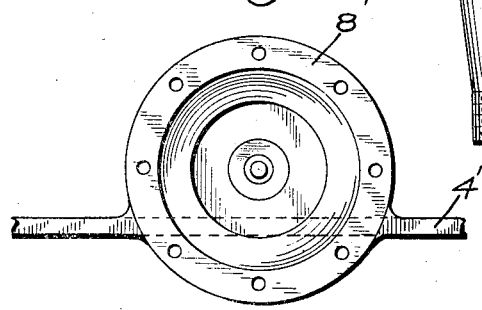
INVENTOR
JOHN F. CRAIG
BY *Wm. M. Cady*
ATTORNEY Patented Mar. 9, 1926.

1,575,737

UNITED STATES PATENT OFFICE.

JOHN F. CRAIG, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed January 2, 1923. Serial No. 610,114.

*To all whom it may concern:*

Be it known that I, JOHN F. CRAIG, a citizen of the United States, residing at Edgewood, in the county of Allegheny and State of Pennsylvania, have invented new and useful Improvements in Automotive Brakes, of which the following is a specification.

This invention relates to automotive brakes, and more particularly to a fluid pressure brake for motor vehicles.

The principal object of my invention is to provide an improved fluid pressure brake adapted for application to the front wheels of a motor vehicle.

In the accompanying drawing; Fig. 1 is a face view of a front wheel brake drum construction showing my improvement applied thereto; Fig. 2 a section on the line 2—2 of Fig. 1; and Fig. 3 a detail fragmentary view, showing a slight modification of my invention.

As shown in Figs. 1 and 2, a brake drum 1 is provided which is adapted to be associated with the front wheel of a motor vehicle having the usual steering knuckle 2 and according to my invention the cover plate of the drum 1 is composed of two half sections 3 and 4. At one side of the steering knuckle, the sections 3 and 4 are provided with registering lugs 5, by which the sections are secured together by means of a bolt 6. At the other side of the steering knuckle, the sections 3 and 4 are cut away as partially shown at 7.

A brake chamber is provided comprising casing members 8 and 9 having peripheral bolting flanges and clamped between said flanges by bolts 10 is a flexible diaphragm 11 which is operatively connected to a diaphragm rod 12. Each member 8 and 9 is provided with a lug 13 so that one member may be secured by a bolt 14 to the plate section 4 and the other member to the section 3. As shown in Fig. 2, the lugs 13 are so positioned on the casing members 8 and 9 that the diaphragm chamber when secured in position extends into the space formed by the drum 1 and thus reduces the overhang of the brake chamber as well as bringing the axis of the diaphragm rod 12 closer to the cam which operates the brake members within the drum.

The diaphragm rod 12 is pivotally connected to an arm 15 secured to cam shaft 16, the rotation of which is adapted to operate the usual cam for expanding the usual brake members mounted within the brake drum 1. A flexible pipe 17 is connected to the chamber in the brake casing at the side of the diaphragm 11 opposite the diaphragm rod 12, so that fluid under pressure may be supplied to the flexible diaphragm for operating the rod 12 to apply the brakes.

The fluid pressure brake chamber being carried by the plate sections of the brake drum will turn with the front wheel of the vehicle, as the wheels are turned in steering, so that the brakes may be applied and released without interfering in any way with the turning of the wheels.

In assembling the parts, the two plate sections with the attached casing members 8 and 9 are brought together, so that the peripheries of the two sections engage the flange 18 of the drum 1 and the sections are then secured together by means of the bolt 6 and by applying the bolts 10 which clamp the casing members 8 and 9 together, the bolts 10 at the same time serving to clamp the sections 3 and 4 together.

Instead of making the casing members 8 and 9 separate from the sections 3 and 4, as shown in Figs. 1 and 2, said members may be formed as integral parts of the plate sections, as shown in Fig. 3, in which the plate section 4' is shown as provided with an integral casing member 8', the other section being made in the same manner.

Having now described my invention, what I claim as new and desire to secure by Letters Patent, is:—

1. The combination with a vehicle brake drum, of a cover plate for said drum comprising two half sections and a fluid pressure brake chamber comprising two casing members, one of said members being carried by each plate half section.

2. The combination with a vehicle brake drum, of a cover plate for said drum comprising two half sections, a fluid pressure brake chamber comprising two casing members, one of said members being carried by each plate half section, and bolts for securing together said casing members as well as said half sections.

3. The combination with a vehicle brake drum, of a cover plate for said drum comprising two half sections, a fluid pressure brake chamber comprising two casing members, one of said members being carried by each plate half section, a flexible diaphragm interposed between said casing members, and means for securing together said half sections and said casing members.

In testimony whereof I have hereunto set my hand.

JOHN F. CRAIG.